Figure 1:
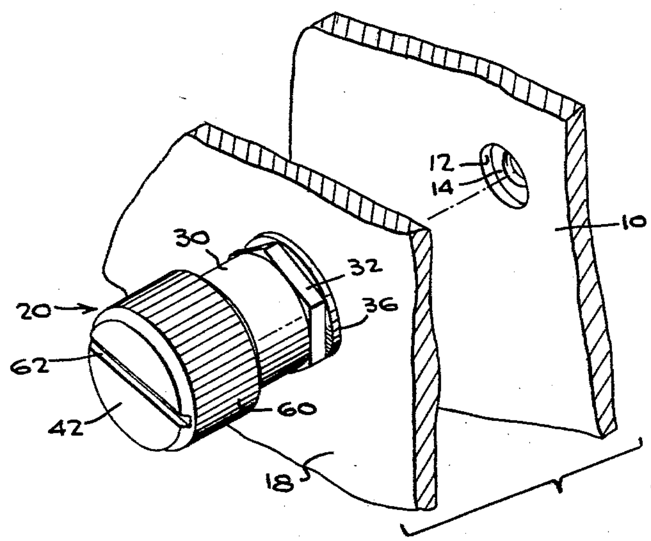

FASTENER-CAPTIVE FRONT PANEL

Filed March 2, 1962 2 Sheets-Sheet 1

INVENTOR.
CHARLES FRANK
BY
McMorrow, Berman & Davidson
ATTORNEYS

April 27, 1965 C. FRANK 3,180,389
FASTENER-CAPTIVE FRONT PANEL
Filed March 2, 1962
2 Sheets-Sheet 2
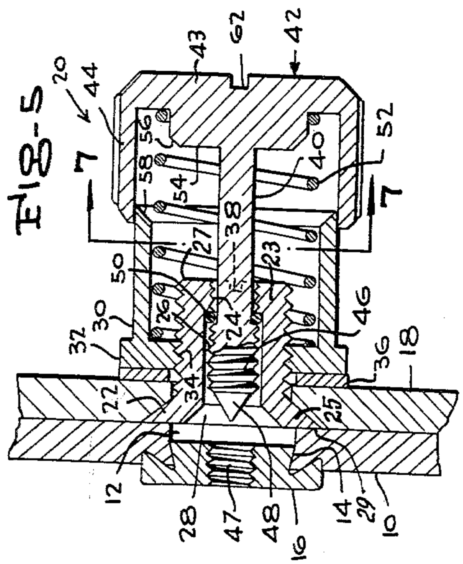
INVENTOR.
CHARLES FRANK
BY
McMorrow, Berman & Davidson
ATTORNEYS United States Patent Office 3,180,389 Patented Apr. 27, 1965

3,180,389
FASTENER-CAPTIVE FRONT PANEL
Charles Frank, 436 New Lots Ave., Brooklyn, N.Y.
Filed Mar. 2, 1962, Ser. No. 177,028
1 Claim. (Cl. 151—69)

This invention relates to a captive fastener for removably securing operating units to a planned layout on a mounting panel, where the units must be removed periodically for inspection, repair, or maintenance, the fasteners being carried by the units, so that they are at all times in place, and ready to perform their intended function. While the fastener has particular application in the assembly of electronic devices, it is not limited to that particular field of use, but may be employed to advantage wherever similar problems or demands are encountered.

An object of the invention is the provision of a generally superior fastener of the kind indicated, which affords clear visual and audible indication of the fact of disengagement of the fastener, as distinguished from full or partial engagement with a mounting panel. More particularly it is an object to provide a spring-biased telescoping fastener of improved construction. In still greater particular, it is an object to provide a telescoping screw fastener, in which the working threads perform the added function of retaining the parts of the telescoping component united. Yet another object is to provide a thread protector for a fastener as aforesaid, which also assists in retaining the telescoping parts assembled.

Figure 2:
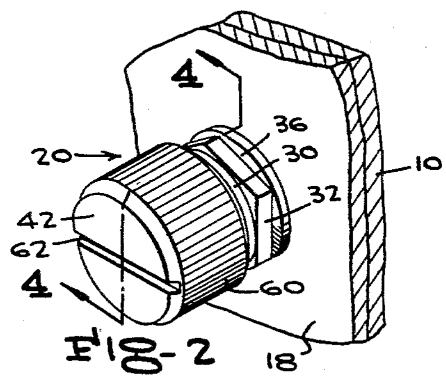
Figure 3:
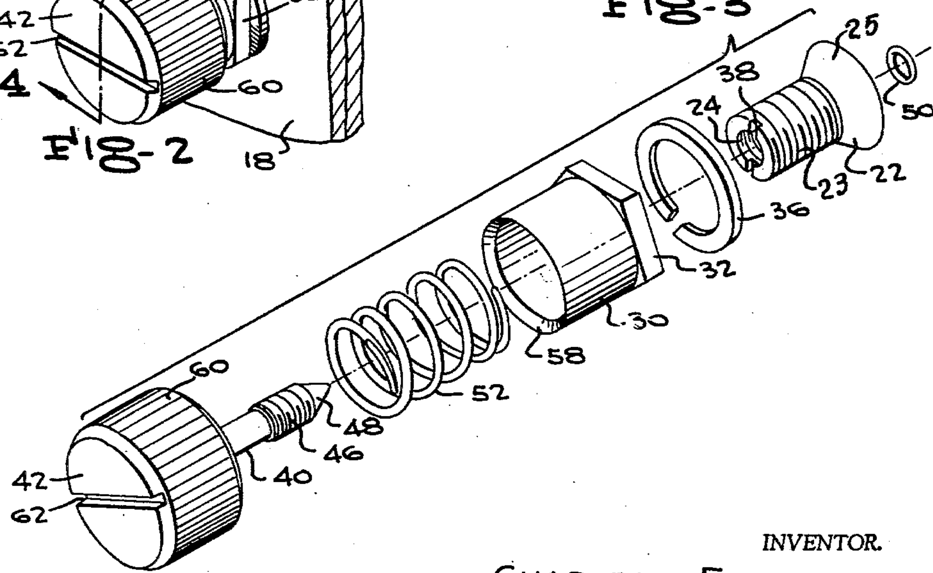

These and other ends, which will be readily apparent, are attained by the present invention, a preferred form of which is described in the following specification, as illustrated in the drawings, in which:

FIGURE 1 is an exploded fragmentary perspective view, showing an operating unit positioned for attachment to a mounting panel, FIGURE 2 is a view similar to FIGURE 1, showing the parts of FIGURE 1 secured together, FIGURE 3 is an exploded view, in perspective, showing the parts of the telescoping, male component of the fastener, FIGURE 4 is an axial, sectional view through the fastener, as seen along the line 4—4 of FIGURE 2, FIGURE 5 is a view similar to FIGURE 4, showing the male component of the fastener unthreaded from the holding nut, and the telescoping parts expanded, FIGURE 6 is a sectional view taken on the plane of the line 6—6 of FIGURE 4, and FIGURE 7 is a sectional view, taken on the plane of the line 7—7 of FIGURE 5.

Referring to the drawings by characters of reference, there is shown, in FIGURES 1, 2, 4 and 5, a panel 10, or other mounting wall, having a bore 12, adapted to receive flared circular shank 14 of a self-clinching nut 16, which is permanently fixed in place. Ordinarily, these nuts will be provided in multiple on the mounting panel, in an accurate layout pattern designed for the particular units to be attached to the panel. Cooperating with the mounting panel 10 is a panel 18, which is part of a mountable unit, carries a fastener, indicated as a whole by the numeral 20, the parts of which are shown in exploded positions in FIGURE 3, and which includes the male component cooperating with the fixed nut 16.

With particular reference to FIGURES 3, 4 and 5, the captive fastener 20 comprises a flat-headed anchoring screw 22, received in a countersunk bore in the panel 18, with its head 25 flush with one face of the panel. The shank 23 of the screw 22, which serves as a retainer for parts of the unit 20, presently to be described, has a small, threaded, axial bore 24 at its outer end 27, a cylindrical counterbore 26 throughout the balance of its shank, and a frusto-conical counterbore 28 opening to the flat surface 29 of its head. A cylindrical cup or tubular nut 30 has an inner end wall 32, with hexagonal periphery for engagement with a wrench, and has a central, threaded bore 34 extending through the wall 32, engageable with the outer threads of anchoring screw 22, a lock washer 36 being provided between the wall 32 and the panel 18. The threading can be started by hand, and for holding the screw 22 stationary during wrench tightening of the cup 30, the outer end of the screw 22 is provided with a diametral slot 38, for engagement by a screwdriver.

Slidably and rotatably engaged on the cup 30, is a cup-shaped head 42, having an outer end wall 43, and a side wall 44. A relatively small diameter axial stem 40 is fixed to and extends inwardly from the outer end wall 43. The stem 40 is smaller in diameter than the bore 24 in the anchoring screw shank 23, so as to freely and slidably extend therethrough, and carries, at its inner end, a threaded portion 46, which threads through the bore 24, and then threaded in the bore 47 of nut 16, on the mounting panel 10. Initiation of these threading operations is facilitated by a conical tip 48 on the inner end of the stem 40.

It will be seen that once the threaded portion of the stem has moved past threaded bore 24 and into the smooth cylindrical bore portion 26 of the anchoring screw 22, the male component of the fastener is held captive on the panel 18, since it cannot be removed accidentally, but only by deliberate unthreading rotation thereof. However, an additional retaining means is provided in the form of an O-ring 50 of plastic, or other resilient material, sized to snugly fit on the stem 40, outwardly of the threaded portion thereof. The ring 50 not only serves as an effective retainer, but also serves to protect the threads of the stem 40 from abuse.

In order to hold the threaded stem retracted when panel 18 is unattached, a coil expanding spring 52 is provided, which is circumposed on the shank of the screw 22 and surrounds the stem 40, and is compressed between the end wall 32 of cup 30 and the outer end wall of head 42. In order to hold the spring in concentric position at all times, the head 42 is provided with an internal, central boss 54 around which the related end of the spring is engaged. For smoother action in the mounting of the spring, as well as in its flexure during use, the boss 54 has a bevelled corner 56, and the outer end of cup 30 has an internal bevel 58. For manual threading, side wall 44 of head 42 has a knurled outer surface, such as provided by corrugations 60. A slot 62 is provided in the end wall of the head 42 for a screwdriver.

The spring bias not only holds the captive screws all out of the way until the panel 18 has been properly located on panel 10 for fastening, but also present another advantage in providing a positive removal of the screw at the completion of unthreading, accompanied by an audible as well as visual signal, so that the chances of damage or other mishap during hasty removal are minimized.

While a certain, preferred embodiment has been shown and described, various modifications will become apparent, in the light of this disclosure, and the invention should not, therefore, be deemed as limited, except insofar as shall appear from the spirit and scope of the appended claim.

I claim:

In combination, a mounting support, a nut fixed on the support, a mountable panel formed with an opening, a screw having a head secured in said opening, said screw having externally-threaded shank extending beyond the outer surface of the panel, a tubular nut having an inner end wall formed with an axial threaded bore threaded on the shank of the screw and bearing against the outer surface of the panel, said tubular nut having a cylindrical sidewall larger in diameter than the screw shank and extending outwardly from its inner end wall, a cup-shaped head having an outer end wall and a cylindrical sidewall slidably and rotatably engaged over the sidewall of the tubular nut, a reduced diameter smooth stem fixed to and extending inwardly from the outer end wall of the head, the shank of the screw being formed with a smooth bore portion opening through its head and with a reduced diameter threaded bore portion opening to the outer end of the shank, said stem having a threaded portion at its inner end and adapted to be initially threaded through said reduced threaded bore portion and finally threaded through the bore of the support nut, said threaded portion of the stem being smaller in diameter than the smooth bore portion of the screw shank, and a coil spring surrounding the screw shank and the stem and compressed between the inner end wall of the tubular nut and the outer end wall of the cup-shaped head, said threaded portion of the stem being larger in diameter than the remainder of the stem, and a non-metallic resilient ring fixedly circumposed on the stem at the inner end of the threaded portion of the stem, said ring being adapted, in a retracted position of the stem, to harmlessly engage the shoulder defined at the meeting of the smooth bore portion and the threaded bore portion of the shank of the screw.

References Cited by the Examiner

UNITED STATES PATENTS

| | | | |
|---|---|---|---|
| 1,491,394 | 4/24 | Griffith. | |
| 1,664,820 | 4/28 | Hughes | 151—69 |
| 1,863,496 | 6/32 | Mooney | 85—1 |
| 2,136,875 | 11/38 | Blanc. | |
| 2,486,769 | 11/49 | Watson | 151—41.73 |
| 2,639,179 | 5/53 | Phelps | 151—41.73 |
| 2,967,557 | 1/61 | Tait et al. | 151—69 |
| 3,059,736 | 10/62 | Boyd | 151—69 |

EDWARD C. ALLEN, *Primary Examiner.*

CARL W. TOMLIN, *Examiner.*